United States Patent [19]

Schiek

[11] Patent Number: 4,650,430

[45] Date of Patent: Mar. 17, 1987

[54] MARINE DRIVE GEAR CASE LUBRICATION SYSTEM

[75] Inventor: James M. Schiek, Omro, Wis.

[73] Assignee: Brunswick Corporation, Skokie, Ill.

[21] Appl. No.: 765,325

[22] Filed: Aug. 13, 1985

[51] Int. Cl.$^4$ ............................................. B63H 23/34
[52] U.S. Cl. ........................................ 440/88; 440/78; 440/83; 384/369; 123/196 W; 184/6.18; 184/26
[58] Field of Search ..................... 440/75, 78, 88, 83, 440/900; 384/369, 398; 123/196 W, 195 P; 184/6.18, 26

[56] References Cited

U.S. PATENT DOCUMENTS 1,198,856  9/1916  Lachmann ..................... 384/369
3,943,790  3/1976  Meyer ............................ 440/78

FOREIGN PATENT DOCUMENTS 8805    2/1880   Fed. Rep. of Germany ...... 384/369
63368   10/1919  Fed. Rep. of Germany ...... 384/398
300129  9/1954   Switzerland ..................... 384/369

Primary Examiner—Galen L. Barefoot
Assistant Examiner—Edwin L. Swinehart
Attorney, Agent, or Firm—Andrus, Sceales, Starke & Sawall

[57] ABSTRACT

A lubrication and circulation system is provided for a marine drive lower gear case (4). A self-lubricating heat conducting flat thrust washer bearing (26) around the drive shaft (6) has a bottom horizontal surface (30) engaging the top of the pinion gear (10) at the bottom of the drive shaft (6) without needle bearings or roller bearings interposed therebetween. Lubricant frictionally dragged by the top of the pinion gear (10) across the bottom horizontal surface (30) of the thrust bearing washer (26) is diverted along the slants of slots (36 and 38) at an angle to the radius (40) inwardly toward the drive shaft (6) rotating therein. Upper and lower self-lubricating heat conducting sleeve bearings (18 and 20) mount the drive shaft (6) for rotation in the lower gear case (4) without needle bearings or roller bearings therebetween. Each sleeve bearing has a spiral groove (48) in its inner surface (50) in a helical direction driving lubricant upwardly therethrough along the drive shaft (6) as the latter rotates therein. Lubricant is circulated through the thrust washer bearing (26) and the sleeve bearings (18 and 20) to carry heat away from the bearings and substantially increase longevity thereof, matching and exceeding the life rating of needle or roller bearing arrangements for the vertical drive shaft in a marine drive.

1 Claim, 7 Drawing Figures

MARINE DRIVE GEAR CASE LUBRICATION SYSTEM

BACKGROUND AND SUMMARY

The invention relates to a simplified marine drive gear case eliminating the need for needle or roller bearings supporting the vertical drive shaft.

The invention accomplishes the noted simplification by means of sleeve bearings and a thrust washer bearing, and a lubrication system for circulating lubricant through the sleeve bearings and the thrust washer bearing to carry heat away therefrom to substantially increase longevity. It has been found in durability testing that the lubrication system and sleeve and thrust washer bearing arrangement not only meets but far exceeds the life rating of needle or roller bearing arrangements for the vertical drive shaft in a marine drive.

DETAILED DESCRIPTION

Figure 1:
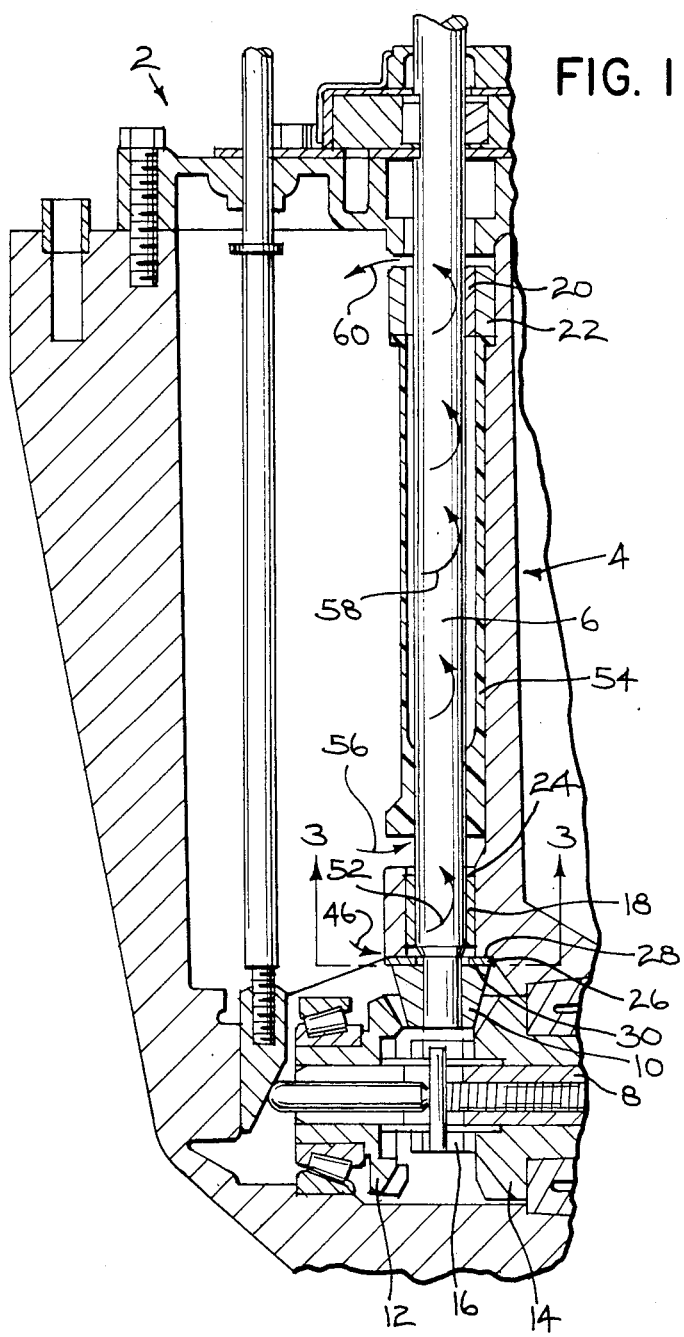
FIG. 1 is a sectional view of a marine drive lower gear case illustrating the invention.

FIG. 1 shows a portion of a marine drive 2 similar to that shown in Schiek U.S. Pat. No. 4,317,655, incorporated herein by reference. Also incorporated herein by reference are Croisant U.S. Pat. No. 3,931,783, Kiekhaefer U.S. Pat. No. 2,549,477 and Holtermann U.S. Pat. No. 3,645,360, showing various gear case lubrication systems.

The marine drive includes a lower gear case 4 having lubricant therein. Drive shaft 6 extends downwardly in the gear case and is rotatably mounted therein for rotation about a vertical axis. A propeller shaft 8 is rotatably mounted in the gear case for rotation about a horizontal axis substantially orthogonal to the drive shaft. A pinion gear 10 is mounted at the bottom of the drive shaft and rotates therewith. Drive gear means for driving the propeller shaft is provided by a pair of counter-rotating gears 12 and 14 concentric with the propeller shaft and driven by pinion gear 10, and a central clutch 16 axially slideable along the propeller shaft to selectively engage either of driven gears 12 and 14 for forward or reverse propulsion, all as is well known.

Means are provided for supporting drive shaft 6 in the gear case without needle or roller bearings. A pair of spaced self-lubricating heat conducting sleeve bearings 18 and 20 mount drive shaft 6 for rotation in the gear case. These bearings may be DU type supplied by Garlock Bearings, Inc. These bearings have a steel strip outer backing layer, a porous bronze middle layer, and a teflon inner layer against the drive shaft. The bearings are mounted to the gear case housing at retainers 22 and 24, and do not rotate relative to the gear case.

Means are provided for absorbing upward axial thrust on the drive shaft from either of gears 12 and 14 and the reaction thrust therefrom, again without needle or roller bearings. A self-lubricating heat conducting thrust washer bearing 26 has a top surface stopped against an abutment 28 in the gear case and a bottom surface 30 engaging the top of pinion gear 10. Thrust bearing washer 26 may be a DX type material bearing supplied by Garlock Bearings, Inc. This bearing has a steel outer backing layer providing the noted top surface, a pourous bronze middle layer, and an acetal resin or teflon bottom layer providing bottom surface 30. The top of pinion gear 10 frictionally slides rotationally against the bottom surface 30 of thrust bearing washer 26. Thrust bearing washer 26 is fixed relative to the gear case and does not rotate relative thereto.

Figure 3:
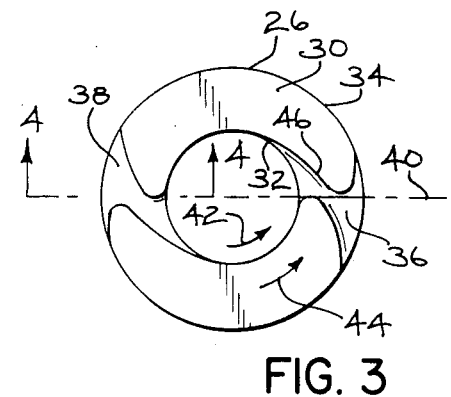
FIG. 3 is a bottom plan view of the thrust washer bearing in FIG. 1, and is taken along line 3—3 of FIG. 1.
Figure 4:
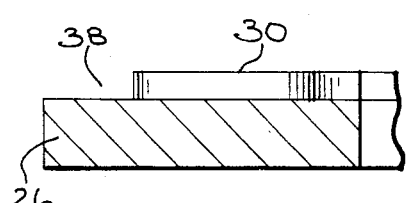
FIG. 4 is a sectional view taken along line 4—4 of FIG. 3.

Means are provided for circulating lubricant through thrust bearing washer 26 and through the sleeve bearings 18 and 20. The bottom horizontal surface 30 of thrust washer bearing 26 directly engages the top of pinion gear 10 without needle bearings or roller bearings interposed therebetween. The bottom surface 30 of thrust bearing washer 26 is shown in FIG. 3. The thrust washer bearing has an inner circumference 32 and an outer circumference 34. Bottom horizontal surface 30 has one or more slots or recessed grooves such as 36 and 38 extending between outer and inner circumferences 34 and 32 and slanted at an angle to the radius 40. Arrows 42 and 44 show the direction of rotation of drive shaft 6 within thrust bearing washer 26 and of pinion gear 10 across the bottom horizontal surface 30 of thrust bearing washer 26. Lubricant frictionally dragged by the top of pinion gear 10 across bottom horizontal surface 30 into slot 36 is diverted along the slant of the slot inwardly at slot edge 46 toward inner circumference 32 and drive shaft 6. Lubricant frictionally dragged by the top of pinion gear 10 across bottom horizontal surface 30 into slot 38 is likewise diverted along the slant of the slot inwardly toward inner circumference 32 and drive shaft 6. Lubricant in lower gear case 4 is thus drawn or pumped inwardly at 48, FIG. 1, through thrust bearing washer 26 toward drive shaft 6.

Figure 2:
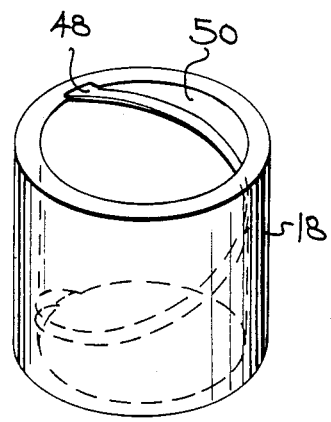
FIG. 2 is an isometric view of one of the sleeve bearings supporting the drive shaft in FIG. 1.

Lower sleeve bearing 18, FIGS. 1 and 2, has a spiral groove 48 in its inner surface 50 in a helical direction for driving lubricant from the inner circumference 32 of thrust washer bearing 26 and drive shaft 6 upwardly through lower sleeve bearing 18 along drive shaft 6 as the latter rotates in lower sleeve bearing 18. Lubricant is thus pumped through sleeve bearing 18 as shown at 52, FIG. 1. A guide sleeve 54 is provided by a plastic member mounted to lower gear case 4 around drive shaft 6 between sleeve bearings 18 and 20 for confining and guiding lubricant upwardly along drive shaft 6. Guide sleeve 54 is fixed in gear case 4, and drive shaft 6 rotates therein. Guide sleeve 54 may be internally spiraled to further pump lubricant from lower sleeve 18 and from opening 56, then upwardly within guide sleeve 54 as shown at 58. Upper sleeve bearing 20 has a spiral groove in its inner surface in a helical direction, comparably to sleeve bearing 18, and drives lubricant from guide sleeve 54 upwardly through upper sleeve bearing 20 along drive shaft 6 as the latter rotates in sleeve bearing 20. Lubricant is discharged at 60 at the top of upper sleeve bearing 20 back into gear case 4 for recirculation.

The circulation of lubricant through thrust bearing washer 26 and sleeve bearings 18 and 20 carries heat away from these bearings and substantially increases longevity thereof. As noted in the literature regarding self-lubricating bearings, including for example the above noted Garlock Bearings, excellent bearing performance is enabled in temperature ranges up to certain limits. In the lubrication system in accordance with the invention for a marine drive gear case, heat is carried away from the bearings to reduce and control the temperature thereof and ensure not only temperature maintenance below given limits, but also a reduction in temperature which has been found to afford even better performance in terms of longer life. This removal of heat affords a longer lasting and more reliable marine drive.

Figure 5:
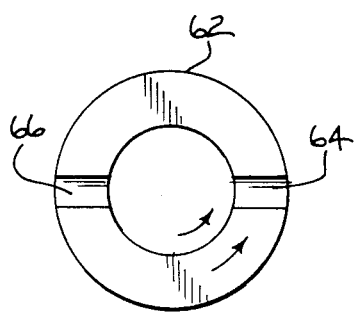
FIG. 5 is a view like FIG. 3 showing an early unsuccessful design.
Figure 6:
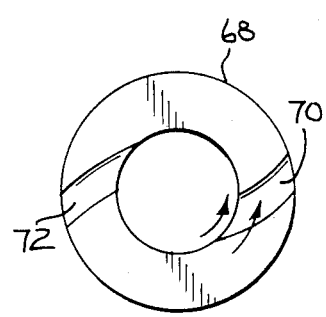
FIG. 6 is another view like FIG. 3 showing another early unsuccessful design.
Figure 7:
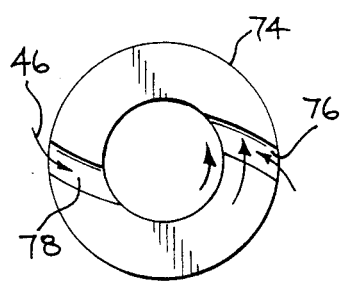
FIG. 7 is a view like FIG. 3 showing a successful design.

During development, various thrust washer bearing designs were tried. FIG. 5 shows an early design of a thrust bearing washer 62 in a view like that of FIG. 3. The direction of rotation of the drive shaft and pinion gear are shown at the arrows. Straight slots 64 and 66 are shown extending along the radius. Another early design is shown in FIG. 6 with thrust bearing washer 68 having slots 70 and 72. The next generation design is shown in FIG. 7 at thrust bearing washer 74 having slots 76 and 78. The three designs in FIGS. 5–7 were lab tested with identical parameters to determine pumping capability. The design in FIG. 5 pumped lubricant to a height of twenty-four inches in a one-eighth inch inner diameter hose in a time of one minute and seven seconds. The design in FIG. 6 provided the same lift in two minutes and twenty-six seconds. The design in FIG. 7 provided the same lift in twenty-five seconds. The superior performance of the design of FIG. 7 is due to the orientation of slots 76 and 78 being slanted from the outer circumference toward the inner circumference in the same direction as rotation of the drive shaft and pinion gear. The slots in FIG. 5 are not slanted. The slots in FIG. 6 are slanted in the opposite direction, i.e., slanted from the outer circumference to the inner circumference in the opposite direction of rotation as the drive shaft and pinion gear. The superior performance of the slant design in FIGS. 7 and 3 is due to the lubricant being frictionally dragged by the top of the pinion gear across the bottom surface of the thrust bearing washer and into the slot, and diverted along the slant of the slot inwardly toward the inner circumference and drive shaft.

It is recognized that various alternatives and modifications are possible within the scope of the appended claims.

I claim:

1. A lubrication and circulation system for a marine drive lower gear case having lubricant therein, comprising:
    a drive shaft extending downwardly in said gear case and rotatably mounted therein;
    a pinion gear mounted at the bottom of said drive shaft;
    a propeller shaft rotatably mounted in said gear case substantially orthogonally to said drive shaft;
    drive gear means in said gear case for driving said propeller shaft and comprising a pair of counter-rotating gears driven by said pinion gear and concentric with said propeller shaft;
    a self-lubricating heat conducting flat thrust washer bearing around said drive shaft and having a top horizontal surface stopped against an abutment in said gear case for absorbing upward axial thrust, and having a bottom horizontal surface engaging the top of said pinion gear without needle bearings or roller bearings interposed therebetween, said thrust washer bearing having an inner and outer circumference, said bottom horizontal surface of said thrust washer bearing having at least one slot therein extending between said inner and outer circumferences and slanted at an angle to the radius such that lubricant frictionally dragged by the top of said pinion gear across said bottom horizontal surface of said thrust washer bearing and into said slot is diverted along the slant of said slot inwardly toward said inner circumference and said drive shaft;
    upper and lower self-lubricating heat conducting sleeve bearings mounting said drive shaft for rotation in said gear case without needle bearings or roller bearings therebetween, said lower sleeve bearing having a sprial groove in its inner surface in a helical direction driving lubricant from said inner circumference of said thrust washer bearing and said drive shaft upwardly through said lower sleeve bearing along said drive shaft as the latter rotates in said lower sleeve bearing;
    said upper sleeve bearing having a spiral groove in its inner surface in a helical direction driving lubricant upwardly through said upper sleeve bearing along said drive shaft as the latter rotates in said upper sleeve bearing,
    such that lubricant is circulated through said thrust washer bearing and said sleeve bearings to carry heat away from said thrust washer bearing and said sleeve bearings to substantially increase longevity thereof;
    wherein said slot in said thrust washer bearing extends from said outer circumference to said inner circumference at an angle slanted from said outer circumference in the same direction as rotation of said drive shaft and pinion gear;
    wherein lubricant is discharged at the top of said upper sleeve bearing back into said gear case for recirculation;
    a guide sleeve around said drive shaft between said sleeve bearings for confining and guiding lubricant upwardly along said drive shaft;
    wherein said guide sleeve has a top end substantially adjacent the bottom of said upper sleeve bearing, and wherein said guide sleeve has a bottom end spaced above the top of said lower sleeve bearing by a gap therebetween, and such that lubricant is pumped upwardly through said guide sleeve from both said lower gear case at said gap and from said lower sleeve bearing.

* * * * *